(12) United States Patent
Myers et al.

(10) Patent No.: US 9,707,911 B1
(45) Date of Patent: Jul. 18, 2017

(54) IDENTIFYING A DRIVER OF A VEHICLE

(71) Applicant: Ford Global Technologies, LLC, Dearborn, MI (US)

(72) Inventors: Scott Vincent Myers, Camarillo, CA (US); Shane Elwart, Ypsilanti, MI (US); Walter Joseph Talamonti, Dearborn, MI (US); Jonathan Thomas Mullen, Palo Alto, CA (US); Zachary David Nelson, San Mateo, CA (US); Tory Smith, San Francisco, CA (US); Bibhrajit Halder, Palo Alto, CA (US); Kyu Jeong Han, Palo Alto, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/076,360

(22) Filed: Mar. 21, 2016

(51) Int. Cl.
*B60R 16/037* (2006.01)
*H04W 4/00* (2009.01)
*H04L 12/26* (2006.01)

(52) U.S. Cl.
CPC ............ *B60R 16/037* (2013.01); *H04L 43/16* (2013.01); *H04W 4/005* (2013.01)

(58) Field of Classification Search
CPC ....... B60R 16/037; H04L 43/16; H04W 4/005
See application file for complete search history.

(56) References Cited

U.S. PATENT DOCUMENTS

| | | | |
|---|---|---|---|
| 7,602,947 B1 | 10/2009 | Lemelson | |
| 8,005,269 B2 | 8/2011 | Weidhaas | |
| 8,788,113 B2 | 7/2014 | Filev | |
| 8,937,528 B2 | 1/2015 | Protopapas | |
| 2014/0172238 A1 | 6/2014 | Craine | |
| 2014/0200737 A1 | 7/2014 | Lortz | |
| 2014/0282931 A1 | 9/2014 | Protopapas | |
| 2014/0303899 A1 | 10/2014 | Fung | |
| 2015/0242605 A1* | 8/2015 | Du | G06F 21/31 726/7 |
| 2015/0356797 A1* | 12/2015 | McBride | G07C 9/00119 340/5.61 |

FOREIGN PATENT DOCUMENTS

| | | |
|---|---|---|
| CN | 104200805 A | 12/2014 |
| WO | WO-03084787 A1 | 10/2003 |

* cited by examiner

*Primary Examiner* — Michael D Lang
(74) *Attorney, Agent, or Firm* — David R. Stevens; Stevens Law Group

(57) ABSTRACT

The present invention extends to methods, systems, and computer program products for identifying a person as a driver of a vehicle. Aspects include using in-vehicle sensors to increase the accuracy of driver identification initially determined using other mechanisms. As such, at least two different types of sensory devices can be utilized to gather data in an effort to identify the driver. The data gathered from the first sensor (e.g., at a key fob) is processed to identify the driver based on learned characteristic patterns, such as the driver's gait, before the driver enters the vehicle. The data gathered from the second sensor (e.g., in an in-vehicle face or voice recognition system) is processed to confirm the driver. The confirmation is based on biometric data and learned characteristic patterns. Data from the second sensor is provided back to the first sensor to confirm the driver identity.

20 Claims, 3 Drawing Sheets

IDENTIFYING A DRIVER OF A VEHICLE

CROSS-REFERENCE TO RELATED APPLICATIONS

Not applicable.

BACKGROUND

1. Field of the Invention

This invention relates generally to the field of identifying a driver of a vehicle. More particularly, the invention relates to using in-vehicle sensors to increase the accuracy of driver identification initially determined using other mechanisms.

2. Related Art

Many vehicles offer the ability to adjust, or tailor, a vehicle's configuration to match stored preferences for one or more drivers. For example, a driver that is taller than average, may desire the steering column higher and the driver's seat position further away from the vehicle console and in a slightly reclined position. Alternatively, a driver that is shorter than average, may desire the steering column lower and the driver's seat position closer to the vehicle console and in an upright position. Other vehicle systems, such as, for example, climate control, audio settings, etc., can also be modified to match a driver's preferences. Being able to modify, or tailor, a vehicle's configuration results in increased comfort and enhanced driving experiences for the vehicle's drivers.

Some mechanisms attempt to recognize a driver prior to the driver entering the vehicle. By recognizing the driver prior to entry, the vehicle configuration can be adjusted for the driver. Adjusting configuration prior to driver entry alleviates the need for the driver to wait for adjustments to be made after the driver enters the vehicle.

BRIEF DESCRIPTION OF THE DRAWINGS

The specific features, aspects and advantages of the present invention will become better understood with regard to the following description and accompanying drawings where.

DETAILED DESCRIPTION

Figure 1:
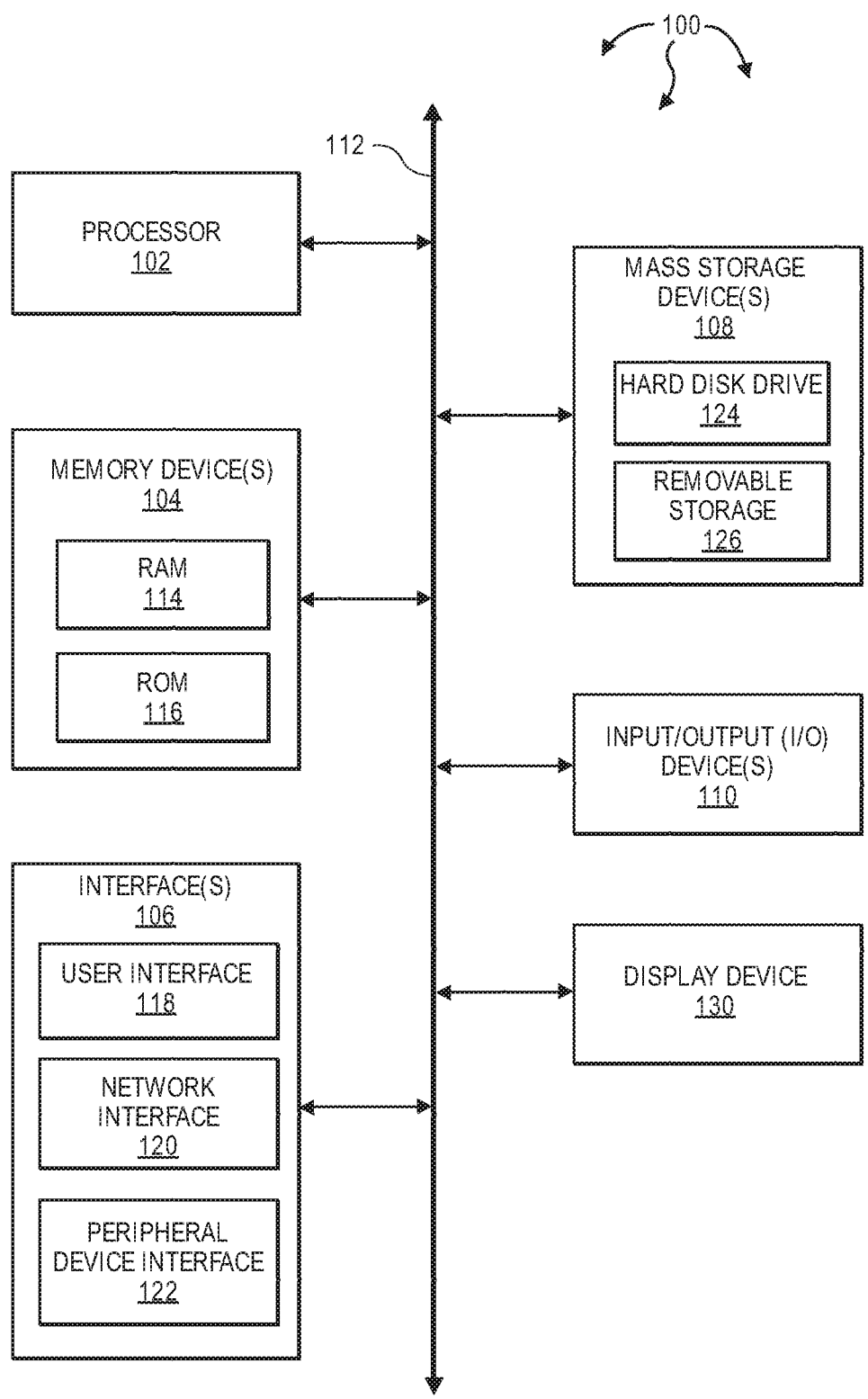
FIG. 1 illustrates an example block diagram of a computing device.

The present invention extends to methods, systems, and computer program products for identifying a driver of a vehicle. Aspects include using in-vehicle sensors to increase the accuracy of driver identification initially determined using other mechanisms. As such, at least two different types of sensory devices can be utilized to gather data in an effort to identify a driver. The data gathered from a first sensor (e.g., at a key fob) is processed to identify the driver based on learned characteristic patterns, such as the driver's gait, before the driver enters the vehicle. The data gathered from a second sensor (e.g., in an in-vehicle face or voice recognition system) is processed to more accurately identify the driver. The more accurate identification is based on biometric data and learned characteristic patterns, such as facial or voice recognition of the driver. Data from the second sensor is provided back to the first sensor to provide feedback (and potentially confirm the driver identity).

In at least one aspect, a key fob is used to identify an approaching driving. The key fob then communicates the identified driver to the vehicle. The vehicle can then adjust the cabin configuration to the preferences of the identified driver. For example, a key fob can be equipped with sensors that are utilized to detect and analyze a set of characteristics related to a person's gait pattern. The sensors are relatively accurate as long as each driver always approaches a vehicle with essentially the same gait pattern.

However, gait patterns for a person can vary depending on differences in speed of approach (walking, jogging, running, etc.), variations in footwear (e.g., running shoes vs. heels), if the driver is using mobility assist devices, (e.g., a walker, crutches), how a fob is being carried (e.g., in purse, in hand, in pocket, etc.) etc. The accuracy of key fob sensors can be degraded when variations in gait patterns occur. The sensors may identify a new driver for a vehicle, when in fact the driver is a prior driver of the vehicle approaching with a different gait pattern. Thus, even when the number of drivers for a vehicle is relatively small (e.g., 1-4 drivers), a key fob may have trouble correctly identifying a driver when gait patterns among drivers vary.

When a key fob incorrectly identities a driver, the vehicle may not know how to adjust cabin configuration prior to driver entry. In some cases, a key fob may incorrectly identify one driver as another driver. Thus, the vehicle may adjust cabin configuration to the preferences for the other driver. When the driver enters, they may have to manually adjust or use other controls in the vehicle to re-adjust to their preferences.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In general, aspects of the invention are directed to identifying a person as a driver of a vehicle prior to the person entering the vehicle. At least two different types of sensory devices are utilized to gather data in an effort to identify the driver. The data gathered from the first sensor is processed to identify the driver based on learned characteristic patterns, such as the driver's gait, before the driver enters the vehicle. The data gathered from the second sensor is processed to confirm the driver based on biometric data and learned characteristic patterns, such as facial or voice recognition of the driver. Data from the second sensor is provided back to the first sensor to confirm the driver identity.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc., networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Aspects of the invention can use in-vehicle sensors to increase the accuracy of driver identification initially determined using other mechanisms. Sensors (e.g., accelerometers (3-axis), gyroscopes, etc.) in a key fob or other mobile device can detect a gait pattern for a person approaching a vehicle. The key fob or other mobile device can analyze the gait pattern to identify a person as a particular driver of a vehicle. The key fob or other mobile device can communicate a driver identifier for the particular driver along with a probability to the vehicle. The probability indicates a confidence that analysis of the gait pattern correctly matched the gait pattern to the particular driver.

Based on the driver identifier and confidence, the vehicle may (or may not) adjust the configuration of the vehicle cabin prior to the person entering the vehicle. For example, when the probability received from the key fob or other mobile device is equal to or above a threshold, the vehicle adjusts the configuration of the vehicle cabin in accordance with the particular driver's stored settings. On the other hand, when the probability received from the key fob or other mobile device is below the threshold, the vehicle does not adjust the configuration of the vehicle cabin.

Subsequent to the person entering the vehicle, an in-vehicle sensor system can sense characteristics of the person to more accurately identify the person. Based on the more accurate identification, the vehicle can determine a further driver identifier for the person (which may or may not be the received driver identifier). When the driver identifier and the further driver identifier match, the vehicle confirms the person as the particular driver. When a received probability is equal to or above the threshold and the particular driver is confirmed, the vehicle maintains the configuration of the vehicle cabin in accordance with the particular driver's stored settings. When a received probability was below the threshold and the particular driver is confirmed, the vehicle adjusts the configuration of the vehicle cabin in accordance with the particular driver's stored settings.

One the other hand, when the driver identifier and the further driver identifier do not match, the vehicle determines that the person is not the particular driver but is another driver. When a received probability is equal to or above the threshold and the person is determined to be another driver, the vehicle adjusts the vehicle cabin (from the prior configuration for the particular driver) in accordance with the other driver's stored settings. When a received probability is below the threshold and the person is determined to be another driver, the vehicle adjusts the configuration of the vehicle cabin in accordance with the different driver's stored settings.

In one aspect, an in-vehicle sensor system includes a camera and facial recognition software. The camera can capture an image of the person (e.g., seated in the driver's seat). The facial recognition software can then process the image to more accurately identify the person. In another aspect, an in-vehicle sensor system includes a microphone and voice print analysis software. The microphone can capture a voice print of the person (e.g., in the vehicle cabin). The voice print analysis software can then process the voice print to more accurately identify the person.

The vehicle sends the further driver identifier to the key fob or other mobile device. The key fob or other mobile device uses the further driver identifier to more accurately match the gait pattern to the driver corresponding to the further driver identifier (whether that is the particular driver or another driver). Thus, on subsequent detections of the gait pattern, the key fob or other mobile device can associate a higher probability with the further driver identifier (which may also be the driver identifier). Further, a driver can be associated with multiple gait patterns which permits key fob (or other mobile device) heuristics to better identify the driver's varying gait patterns.

Figure 2:
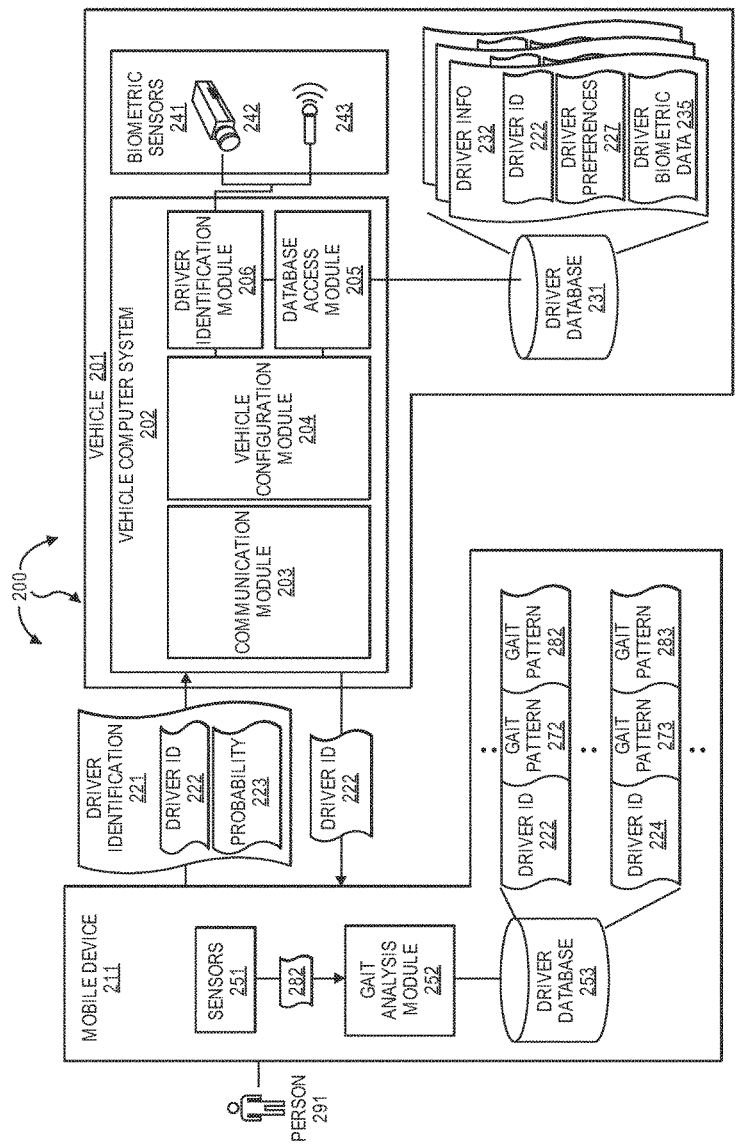
FIG. 2 illustrates an example computer architecture that facilitates identifying a person as a driver of a vehicle.

FIG. 2 illustrates an example computer architecture 200 that facilitates identifying a person as a driver of a vehicle. Referring to FIG. 2, computer architecture 200 includes a vehicle 201 and a mobile device 211. Vehicle 201 and mobile device 211, as well as their respective components can be connected to one another over (or be part of) a network, such as, for example, a PAN, a LAN, a WAN, and even the Internet. Accordingly, each of vehicle computer system 201 and mobile device 211 as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Mobile device 211 can be a key fob or other mobile device, such as, for example, a mobile phone or wearable device (e.g., a smart watch, fitness band, smart glasses, etc.). Mobile device 211 includes sensors 251, a gait analysis module 252, and a driver database 253. Mobile device 211 can also include other modules for communicating with and controlling portions of vehicle 201. For example, mobile device 211 can include modules for locking and unlocking doors, opening a tail gate, starting an engine, etc. A communication module (not shown) in mobile device 211 can communicate using one or more wireless protocols from among: WiMAX, Wi-Fi, Bluetooth, ZigBee, microwave, infrared, near field communication (NFC), etc.

Sensors 251 can include one or more sensors (e.g., gyroscopes, accelerometers, etc.) for detecting a gait pattern for a person holding or carrying mobile device 211. Driver database 253 is configured store associations between drivers and gait patterns. For example, driver database 253 stores an association between a driver ID 222 and gait patterns 272 and 282 and a between driver ID 224 and gait patterns 273 and 283.

In general, gait analysis module 252 is configured to analyze a sensed gait pattern and match the gait pattern to a driver of vehicle 201. Gait analysis module 252 can access associations between drivers and gait patterns from driver database 253. Gait analysis module 252 can attempt to match a sensed gait pattern to a stored gait pattern. When a match is identified, gait analysis module 252 determines that the person holding or carrying mobile device 211 is the driver associated with the stored gait pattern.

Accuracy of a detected match can vary. During gait pattern analysis, gait analysis module 252 can also derive a probability that an identified driver was accurately identified. When a sensed gait pattern is close to (or is identical to) a stored gait pattern, gait analysis module 252 derives a high probability that an associated driver was accurately identified. When differences between a sensed gait pattern and a stored gait pattern are detected, gait analysis module 252 derives a lower probability that an associated driver was accurately identified. More significant differences between a sensed gait pattern and a stored gait pattern lower the probability that an associated driver was accurately identified. When differences are sufficiently different between a sensed gait pattern and any stored gait pattern, gait analysis module 252 determines that a person holding or carrying mobile device is a new driver.

Mobile device 211 can send a driver identifier for an identified driver along with a probability to a vehicle computer system 202. Vehicle computer system 202 can receive the driver identifier and probability from mobile device 211.

Vehicle 201 includes vehicle computer system 202, biometric sensors 241, and driver database 231. Vehicle computer system 202 further includes a communication module 203, vehicle configuration module 204, a driver identification module 206, and a database access module 205.

Communication module 203 is configured to communicate with mobile device 211. For example, communication module 203 can receive a driver identifier and probability from mobile device 211. Communication module 203 can also send a further driver identifier (e.g., which is the same as or different from a received driver identifier) to mobile device 211. The communication can be performed via any of WiMAX, Wi-Fi, Bluetooth, ZigBee, microwave, infrared, near field communication (NFC), etc.

Vehicle configuration module 204 is configured to adjust the settings of the vehicle to match driver preferences. Vehicle settings can include steering column preferences, stereo preferences, driver seat position preferences, and climate control preferences. Adjustment of other vehicle settings is also possible. When a probability received with a driver identifier is equal to or exceeds a threshold (e.g., 50%), vehicle configuration module 204 can interoperate with database access module 205 to access driver preferences for the driver identifier. Vehicle configuration module 204 can adjust settings of vehicle 201 in accordance with the driver preferences. On the other hand, when the probability is less than the threshold, vehicle configuration module 204 does not access driver preferences or adjust settings.

Driver identification module 206 is configured to utilize biometric sensor data from biometric sensors 241 to more accurately identify a driver of vehicle 201. Biometric sensors 241 include camera 242 and microphone 243. Biometric sensors 241 can also include other sensors, such as, for example, a retinal scanner or fingerprint reader. When a person enters vehicle 201, biometric sensors 241 can sense biometric data (e.g., facial features or voice features) of the person. Recognition software in driver identification module 206 (e.g., facial recognition software or voice recognition software) can analyze sensed biometric data to identify a person as a particular driver. For example, a facial recognition system can identify a driver through facial recognition analysis. Likewise, a voice recognition system can identify a driver through voice recognition analysis. Other forms of biometric identification including retinal or fingerprint analysis are also possible.

Driver database 231 stores driver information for one or more drivers of vehicle 201. Driver information for each driver can include a driver identifier, driver preferences, and biometric data. For example, driver database 231 stores driver information 232, including a driver ID 222, driver preferences 227, and driver biometric data 235. Driver identification module 206 can interoperate with database access module 205 to access driver information for the one or more drivers from driver database 231. Driver identification module 206 can compare sensed biometric data for a person to biometric data for each driver. When a match is detected, driver identification module 206 identifies the person as the associated driver.

When a driver is identified, driver identification module 206 can send driver preferences for the driver to vehicle configuration module 204. In one aspect, vehicle configuration module 204 verifies that settings of vehicle 201 are already set in accordance with driver preferences. Verification can occur when settings were previously adjusted due to a received probability equaling or exceeding a threshold and a driver identifier derived from biometric data matching a received driver identifier. In another aspect, configuration module 204 adjusts settings of vehicle 201 in accordance with driver preferences. Adjustments can occur when settings were not adjusted due to a received probability being below a threshold or when a driver identifier derived from biometric data differs from a received driver identifier.

Communication module 203 can send a driver identifier derived from biometric data back to mobile device 211. Mobile device 211 can receive the driver identifier derived from biometric data from vehicle 201. Mobile device 211 can use the derived driver identifier as feedback to increase the accuracy of gait analysis module 252. For example, a sensed gait pattern can be associated with the derived driver identifier in driver database 253. If the derived driver identifier is already included in driver database 253, the sensed gait pattern can be added to the derived identifier. If the derived identifier is not included in driver database 253 (e.g., when a new driver is identified), the derived driver identifier and sensed gait pattern can be stored driver database 253.

In one aspect, a person 291 is in possession of mobile device 211 and approaches vehicle 201. Mobile device 211 can be in the hand of person 201, in a pocket of clothing being worn by person 201, in a purse or bag being carried by person 201, etc.

Figure 3:
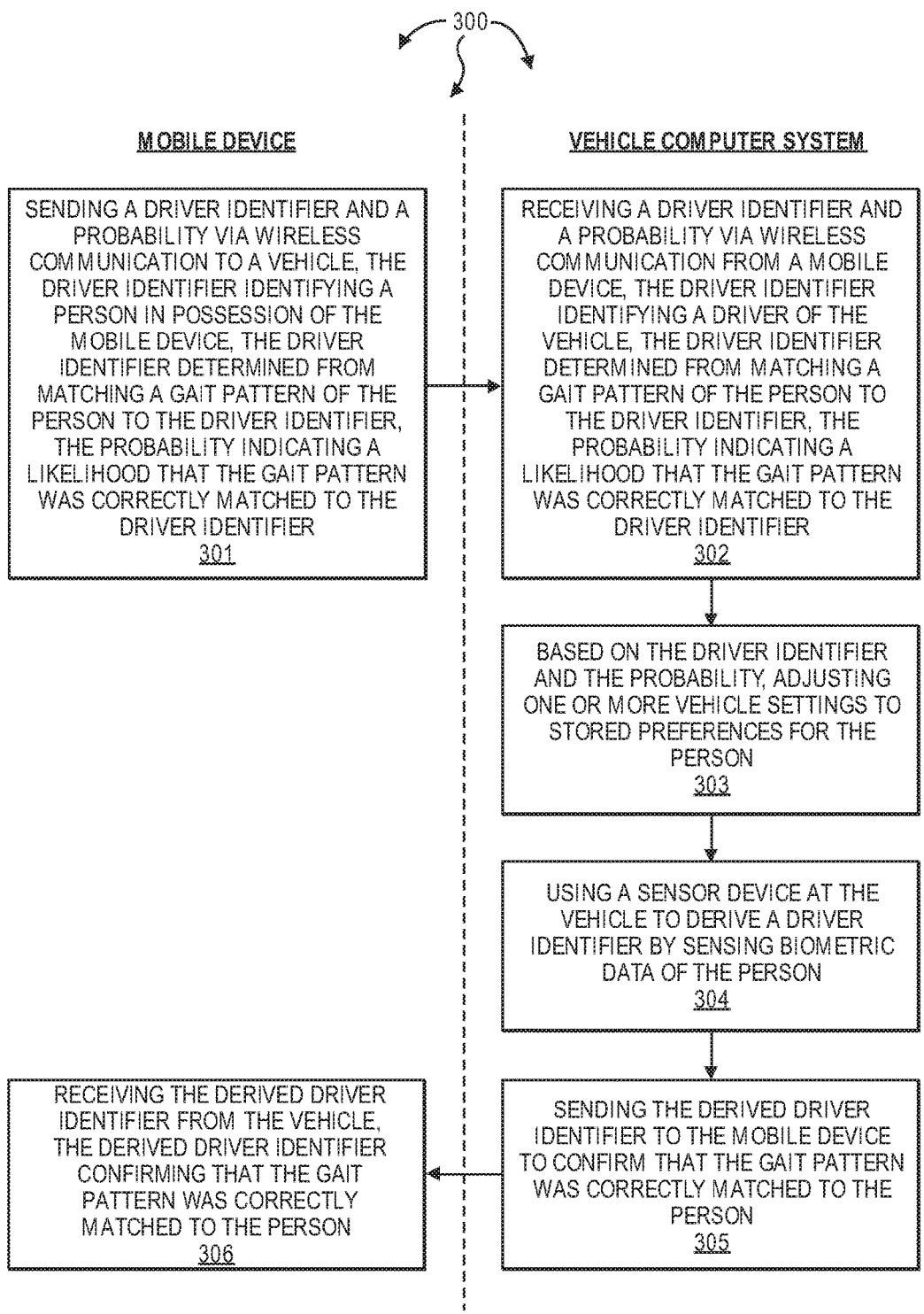
FIG. 3 illustrates a flow chart of an example method for identifying a person as a driver of a vehicle.

FIG. 3 illustrates a flow chart of an example method 300 for identifying a person as a driver of a vehicle. Method 300 will be described with respect to the components and data of computer architecture 200.

Method 300 includes sending a driver identifier and a probability via wireless communication to a vehicle, the driver identifier identifying a person in possession of the mobile device, the driver identifier determined from matching a gait pattern of the person to the driver identifier, the probability indicating a likelihood that the gait pattern was correctly matched to the driver identifier (301). For example, mobile device 211 can send a driver identification 221, including driver ID 222 and a probability 223, to vehicle 201. Sensors 251 can sense gait pattern 282 for person 291. Gait analysis module 252 can analyze gait pattern 282. Gait analysis module 252 can determine that gait pattern 272 is the closest match to a gait pattern 282 within driver database 253. Thus, gait analysis module 252 identifies person 291 as the driver associated with driver ID 222. Gait analysis module 252 can also derive probability 223 (e.g., a percentage) that gait pattern 282 was correctly matched to driver ID 222. Probability 223 can be derived based at least in part on similarities and/or differences between gait pattern 272 and gait pattern 282.

Probability 223 can be derived using any of a variety of different algorithms. In one aspect, gait analysis module 252 includes a neural network that is used to learn individual drivers. The neural network takes in new gait patterns (accelerometer motion) to determine who is carrying a mobile device. The neural network can make assumptions when deriving probability 223. For example, the neural network can assume that a vehicle is driven by 5 or less drivers. Thus, when a new gait pattern is received and 5 drivers are already known to exist, the neural network is more likely to associate the new gait pattern with one of the 5 drivers instead of a completely new driver.

In another aspect, gait analysis module 252 identifies whether or not someone is a primary driver of a vehicle. A primary driver (e.g., a most frequent driver) can be identify by randomly selecting one person (e.g., out of 5) and designating him/her as the primary driver. When a new gait pattern is received, gait analysis module 252 initially determines if the new gait pattern is associated with the primary driver. If so, then further processing is not required to determine probability 223, thereby conserving resources of mobile device 211.

A person to have multiple gait patterns. For example, person 291 may be approaching a vehicle at a casual pace or at a brisk pace. Different pace velocities can result in different gait patterns. Furthermore, different styles of footwear may result in different gait patterns (e.g. candidate driver 291 wearing sneakers versus wearing flats versus wearing high heels). Also, the location of mobile device 211 on candidate driver 291 can result in different gait patterns (e.g. mobile device 211 in purse versus in hand versus in pocket).

Mobile device 211 can sense different gait patterns, analyze the gait patterns, and determine the driver associated with the gait pattern. Thus, mobile device 211 can identify candidate person 291 as a particular driver based on learned characteristic patterns. If mobile device 211 cannot match a gait pattern, the gait pattern can be stored for future reference. If mobile device 211 finds a matching gait pattern, analysis module 252 can derive a probability that the match is correct.

Mobile device 211 can be configured to be self-initializing, to continually monitor gait patterns of an individual, or to capture gait patterns only in certain areas or during certain times. For example, mobile devices 211 can be configured to begin capturing the gait pattern of a driver when mobile devices 211 is within a certain range of the vehicle such as, for example, within radio frequency (RF) range of the vehicle. Mobile devices 211 can also be configured to adaptively learn over time in order to increase accuracy of the identified driver.

Method 300 includes receiving a driver identifier and a probability via wireless communication from a mobile device, the driver identifier identifying a driver of the vehicle, the driver identifier determined from matching a gait pattern of the person to the driver identifier, the probability indicating a likelihood that the gait pattern was correctly matched to the driver identifier (302). For example, vehicle computer system 202 can receive driver identification 221, including driver ID 222 and probability 223, from mobile device 211.

Method 300 includes, based on the driver identifier and the probability, adjusting one or more vehicle settings to stored preferences for the person (303). For example, when probability 223 equals or exceeds a threshold probability (e.g., 50%), vehicle configuration module 204 matches driver ID 222 to driver information 232. Vehicle configuration module 204 can access driver preferences 227 from driver information 232. Vehicle configuration module 204 can adjust settings of vehicle 201 in accordance with driver preferences 227.

More generally, vehicle computer system 202 can be configured to utilize probability 223 to determine if adjusting configuration of vehicle 201 is appropriate prior to entry of person 291 into vehicle 201. For example, if probability 223 is lower than 25%, vehicle computer system 201 can refrain from modifying the configuration of vehicle 201 until after person 291 enters vehicle 201. Furthermore, if mobile device 211 cannot identify person 291 as an existing driver, vehicle computer system 201 can refrain from modifying the vehicle configuration until after person 291 enters vehicle 201 (and, when appropriate, registers driver preferences).

Based on driver ID 222 and probability 223, vehicle configuration module 204 can adjust settings of vehicle 201 to driver preferences 227 on an adaptive basis. For example, upon receiving driver ID 222 and probability 223, vehicle configuration module 204 and database access module 205 can interoperate to access driver information 232 from driver database 231. Vehicle configuration module 204 can use driver preferences 227 to adjust settings within the cabin of vehicle 201. Driver preferences 227 can include steering column preferences, driver seat preferences, stereo preferences, and climate control preferences. Other preferences can also be included.

Method 300 includes using a sensor device at the vehicle to derive a driver identifier by sensing biometric data of the person (304). For example, within vehicle 101, driver identification module 206 can use one or more of biometric sensors 241 to identify person 291. In one aspect, driver identification module 206 identifies person 291 as the driver associated with driver ID 222, confirming the driver identification determined at mobile device 211. In another aspect, driver identification module 206 identifies person 291 as a driver associated with a different driver ID. Driver identification module 206 can use facial or voice print recognition to identify person 291 as corresponding to a particular driver ID.

A facial recognition system can include camera 242 positioned in the vehicle console directed toward the location of the driver's face. The facial recognition system can capture image data of the driver's face and perform image processing to determine the identity of person 291 (with increased accuracy relative to mobile device 211). A voice recognition system can include microphone 243 positioned within the cabin of vehicle 101. The voice recognition system can capture audio data of the driver's voice and perform audio processing to determine the identity of person 291 (with increased accuracy relative to mobile device 211). Other sensors and other biometric analysis modules can also be used to determine the identity of person 291 (with increased accuracy relative to mobile device 211).

Each driver's biometric data can be registered upon initial use of the vehicle, or at any time during the use of the vehicle.

Method 300 includes sending the derived driver identifier to the mobile device to confirm that the gait pattern was correctly matched to the person (305). For example, when biometric analysis identifies person 291 as the driver associated with driver ID 222, communication module 203 can send driver ID 222 back to mobile device 211. Sending driver ID 222 back to mobile device 211 indicates to mobile device 211 that gait pattern 282 was correctly matched with driver ID 222. On the other hand, when biometric analysis identifies person 291 as a driver associated with another different driver ID, communication module 203 can send the other driver ID back to mobile device 211. Sending the other driver ID back to mobile device 211 indicates to mobile device 211 that gait pattern 282 was incorrectly matched with driver ID 222.

Method 300 includes receiving the derived driver identifier from the vehicle, the derived driver identifier confirming that the gait pattern was correctly matched to the person (306). For example, mobile device 211 can receive driver ID 222 back from vehicle computer system 202. In response, gait analysis module 252 can store gait pattern 282 along with driver ID 222 in driver database 253. Alternately, mobile device 211 can receive the other driver ID from vehicle computer system 202. In response, gait analysis module 252 can store gait pattern 282 along with the other driver ID 222 in driver database 253 or can create a new entry for the other driver ID in driver database 253. In each aspect, mobile device 211 uses the received driver ID as feedback to improve subsequent driver identifications.

Accordingly, aspects include a key fob or other mobile device identifying a driver based on learned characteristic patterns. If no matching pattern exists, the pattern is stored for future reference. The key fob or other mobile device informs the vehicle system of a probable driver identifier, including a probability. Based on the driver identifier and probability, the vehicle computer system tunes the vehicle to the driver's stored preferences on an adaptive basis. Driver identification at a mobile device is self-initializing and adaptively improves over time. Improvements in driver identification are facilitated by the vehicle returning training data (indicating that the remote device was right or wrong) to the mobile device and storing multiple gait patterns per driver.

The vehicle computer system uses in-vehicle biometric sensors and corresponding software, (e.g., facial recognition software or voice recognition software) to more accurately identify the driver and derive a further driver identifier for the more accurate driver identification. The vehicle computer system communicates the further driver identifier (derived from facial recognition or voice recognition) to the key fob or other mobile device. The key fob or other mobile device uses the further driver identifier (derived from facial recognition or voice recognition) to more accurately match the most recent characteristics set to a given driver. The driver may have more than one characteristic set.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. A method for use at a vehicle, the method for identifying a person as a driver prior to the person entering the vehicle, the method comprising:

receiving a driver identifier and a probability from a mobile device, the driver identifier identifying the person as a driver of the vehicle, the driver identifier determined through gait analysis at the mobile device, the probability indicating a likelihood that the gait analysis correctly matched the driver identifier to the person;

adjusting vehicle settings to stored preferences for the driver identifier;

using a sensor device at the vehicle to confirm the driver identifier by sensing biometric data of the person; and sending the confirmed driver identifier to the mobile device as feedback to increase the accuracy of subsequent gait analysis used to match the driver identifier to the person.

2. The method of claim 1, wherein receiving a probability from the mobile device comprises receiving a probability indicating a likelihood that a gait pattern detected by sensors of the mobile device was correctly matched to the person.

3. The method of claim 2, further comprising:

sending the confirmed driver identifier to the mobile device to confirm that the gait pattern was correctly matched to the person.

4. The method of claim 1, wherein receiving a driver identifier from a mobile device comprises receiving a driver identifier from one of: a key fob and a smart phone.

5. The method of claim 1, wherein adjusting vehicle settings to stored preferences for the driver identifier comprises adjusting one or more of: a steering column, a stereo, a driver seat position, and climate control.

6. A method for use at a vehicle, the vehicle having a computer system including one or more processors and system memory, the method for confirming a person as a driver of the vehicle, the method comprising:

receiving a driver identifier and a probability via wireless communication from a mobile device, the driver identifier identifying the person as a driver of the vehicle, the driver identifier determined by analyzing a gait pattern at the mobile device, the gait pattern detected by sensors of the mobile device, the probability indicating a likelihood that the gait pattern was correctly matched to the person;

based on the driver identifier and the probability, adjusting one or more vehicle settings to stored preferences for the person;

using a sensor device at the vehicle to derive a driver identifier by sensing biometric data of the person; and sending the derived driver identifier to the mobile device as feedback to confirm that the gait pattern was correctly matched to the person, the feedback increasing the accuracy of subsequently matching the gait pattern to the person at the mobile device.

7. The method of claim 6, wherein the mobile device is a key fob.

8. The method of claim 6, wherein the mobile device is a smart phone.

9. The method of claim 6, further comprising determining that the probability is above a threshold prior to adjusting the one or more vehicle settings.

10. The method of claim 9, wherein adjusting the one or more vehicle settings comprises adjusting the one or more vehicle settings prior to the person entering the vehicle.

11. The method of claim 6, wherein adjusting one or more vehicle settings comprises adjusting one or more of: a steering column, a stereo, a driver seat position, and climate control.

12. The method of claim 6, wherein the sensor device comprises a voice recognition system.

13. The method of claim 6, wherein the sensor device comprises a facial recognition system.

14. The method of claim 6, wherein the sensor device comprises a retinal scanner system.

15. The method of claim 6, wherein the sensor device comprises a fingerprint scanner system.

16. A vehicle computer system for identifying a person as a driver of the vehicle prior to the person entering the vehicle, the system comprising:
   one or more processors;
   system memory;
   a biometric sensor configured to sense biometric data of the person; and
   one or more computer storage devices having stored thereon computer-executable instructions that, when executed by the one or more processors, cause the vehicle computer system to:
      receive a driver identifier and a probability via wireless communication from a mobile device, the driver identifier identifying the person as a driver of the vehicle, the driver identifier determined by analyzing a gait pattern at the mobile device, the gait pattern detected by sensors at the mobile device, the probability indicating a likelihood that the gait pattern was correctly matched to the person;
      based on the driver identifier and the probability, adjust one or more vehicle settings to stored preferences for the person;
      use the biometric sensor to derive a driver identifier by sensing biometric data of the person; and
      send the derived driver identifier to the mobile device as feedback to confirm that the gait pattern was correctly matched to the person, the feedback increasing the accuracy of subsequently matching the gait pattern to the person at the mobile device.

17. The system of claim 16, further comprising computer-executable instructions that, when executed, cause the vehicle computer system to determine that the probability is above a threshold prior to adjusting the one or more vehicle settings.

18. The system of claim 17, wherein computer-executable instructions that, when executed, cause the vehicle computer system to adjust the one or more vehicle settings comprise computer-executable instructions at that, when executed, cause the computer system to adjust the one or more vehicle settings prior to the person entering the vehicle.

19. The system of claim 16, further comprising computer-executable instructions that, when executed, cause the vehicle computer system to query the biometric sensor for driver identification.

20. The system of claim 16, wherein computer-executable instructions that, when executed, cause the vehicle computer system to send the derived driver identifier to the mobile device comprise computer-executable instructions that, when executed, cause the vehicle computer system to send the driver identifier back to the mobile device.

\* \* \* \* \*